(12) United States Patent
Mita et al.

(10) Patent No.: US 6,215,744 B1
(45) Date of Patent: Apr. 10, 2001

(54) INFORMATION RECORDING/ REPRODUCING METHOD AND APPARATUS USING EPRML CONNECTION PROCESSING SYSTEM

(75) Inventors: Seiichi Mita, Kanagawa-ken; Terumi Takashi, Chigasaki; Naoki Satoh, Odawara, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/504,796

(22) Filed: Feb. 15, 2000

Related U.S. Application Data

(62) Division of application No. 08/975,670, filed on Nov. 28, 1997, now Pat. No. 6,069,856.

(30) Foreign Application Priority Data

Nov. 29, 1996 (JP) .................................................. 8-319084

(51) Int. Cl.[7] .................................................. G11B 7/005
(52) U.S. Cl. ..................................... 369/47.24; 369/53.35; 369/59.22
(58) Field of Search .................................. 369/47–48, 54, 369/58, 59, 124.04, 124.05; 360/40, 45, 48, 51, 53; 375/317, 341

(56) References Cited

U.S. PATENT DOCUMENTS

| 5,177,729 | | 1/1993 | Muramatsu et al. .................... 369/59 |
| 5,621,764 | * | 4/1997 | Ushirokawa et al. ................ 375/317 |
| 5,680,380 | | 10/1997 | Taguchi et al. ......................... 369/48 |
| 5,907,586 | * | 5/1999 | Katsuragawa et al. ............... 375/341 |
| 6,069,856 | * | 5/2000 | Mita et al. ............................. 369/48 |

OTHER PUBLICATIONS

International Conference on Communications '91 Conference Record, vol. 2 of 3, pp. 820–824.

* cited by examiner

*Primary Examiner*—W. R. Young
(74) *Attorney, Agent, or Firm*—Antonelli, Terry, Stout & Kraus LLP

(57) ABSTRACT

An information recording/reproducing apparatus includes first and second data demodulators having different data discriminating capabilities. The first data demodulator has a lower data discriminating capability and the second data demodulator has a higher data discriminating capability. When the reliability of reliability information for demodulation data generated by the first data demodulator, the second data demodulator is operated so that demodulation data generated by the first data demodulator is replaced by demodulation data generated by the second data demodulator during a period of time when the reliability of the reliability information is deteriorated.

4 Claims, 13 Drawing Sheets

PRML TRELLIS DIAGRAM

EPRML TRELLIS DIAGRAM

FIG. 4A
TRELLIS DIAGRAM 1
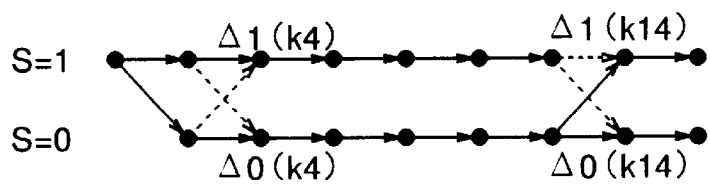
FIG. 4B
TRELLIS DIAGRAM 2
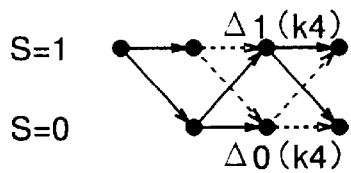
FIG. 5
DECISION EQUATION
(LIKELIHOOD DIFFERENCE)
| TRELLIS TRANSITION | DECISION EQUATION | TRELLIS TRANSITION | DECISION EQUATION |
|---|---|---|---|
| S=1, S=0 (0,0,x) | $\Delta 1(k) = abs(r_k - r_i - 1)$ | S=1, S=0 (0,0,x) | $\Delta 0(k) = abs(r_k - r_i - 1)$ |
| S=1, S=0 (1,0,x) | $\Delta 0(k) = abs(r_k - r_i)$ | S=1, S=0 (1,0,x) | $\Delta 1(k) = abs(r_k - r_i)$ |

IN CASE WHERE PATH
TRANSITION IS CORRECT

IN CASE WHERE PATH
TRANSITION IS ERRONEOUS

INFORMATION RECORDING/REPRODUCING METHOD AND APPARATUS USING EPRML CONNECTION PROCESSING SYSTEM

This application is a divisional of Ser. No. 08/975,670 filed Nov. 28, 1997, now U.S. Pat. No. 6,069,856.

BACKGROUND OF THE INVENTION

The present invention relates to a signal processing system for a magnetic disk device, an optical disk device or the like, and more particularly to a signal processing method and apparatus suitable for the reduction in power consumption of a circuit or LSI.

Recently, a partial response maximum likelihood (hereinafter abbreviated to PRML) decoding system is put into practice as a high-efficiency signal processing system in a magnetic disk device. The high-efficiency signal processing system means a system which can realize a desired data error rate at a low S/N.

FIG. 17 shows an example of the construction of a general magnetic disk device using a PRML signal processing system. The original data is supplied to an encoder 7 for error correction code (ECC) through an interface circuit 8 so that it is added with redundant data necessary for error correction. Next, the original data added with redundant data is subjected by a data modulator 6 to modulation necessary for the PRML system and is recorded on a magnetic disk 3 by a magnetic head 4 through a recording/reproducing amplifier 5. A signal reproduced from the magnetic disk is passed through the recording/reproducing amplifier 5 and then PRML-processed by a data demodulator 71. The demodulated data is error-corrected by a decoder 2 for error correction code and is thereafter converted through the interface circuit 8 into the original data. With such a recording/reproducing process, the reproduction of a low S/N signal is performed. An extended PRML (EPRML) system, an extended EPRML (EEPRML) system, a TRELLIS demodulation system and so forth are investigated as signal processing systems which make the reproduction of a lower-S/N signal possible.

On the other hand, the concept of data demodulation with connection code positioned as a superordinate concept of the signal processing system has been proposed. A known example includes "Producing Soft-Decision Information at the Output of a Class-IV Partial Response Viterbi Detector", International Conference on Communications '91 Conference Record, Volume 2 of 3. This known system is constructed to perform the demodulation of data by combining two signal processing systems as shown in FIG. 18. First, the data demodulator 71 is used at an initial stage to perform the demodulation of data and the extraction of information which gives the reliability of that data. The result of data demodulation at the initial stage is supplied to the next stage formed by the decoder 2 for error correction code which performs the decoding of data at a high efficiency by utilizing the data reliability information. Thus, a connection code scheme utilizing the data reliability information with the coupling thereof with the error correction code decoding system being hitherto taken into consideration is investigated as an effective system for realizing the high-efficiency signal processing system.

In the signal processing system suitable for the implementation of high efficiency and the data demodulating system using the connection code, as mentioned above, high-efficiency data demodulation is attained but an operation processing for performing data demodulation is exponentially complicated. In general, a signal processing circuit having a low data discriminating capability (for example, the PRML system) is simple in data discriminating method and small in both circuit scale and power consumption whereas a signal processing circuit having a high data discriminating capability (for example, the EPRML system or the TRELLIS system) is complicated in circuit and large in power consumption. Accordingly, a signal processing LSI for performing the data demodulation of a low-S/N signal has an increase in scale of an operating circuit and an increase in power consumption thereof. The increase in power consumption results in a substantial hindrance to the realization of a signal processing LSI.

SUMMARY OF THE INVENTION

An object of the present invention is to realize a data demodulating system suppressing an increase in power consumption which results in the largest hindrance to the LSI implementation of a high-efficiency signal processing system. More particularly, an object of the present invention is to realize a data demodulating method and system which can operate a high-efficiency signal processing system such as an EPRML system, a TRELLIS system or the like with a power consumption approximately equivalent to that in the PRML system.

In the present invention, the barometer of a data reliability proposed by a connection code scheme is utilized in respect to the reduction of a power consumption, thereby making it possible to remarkably reduce the power consumption of a signal processing circuit with a high-efficiency decoding performance being kept. Basically, this is realized by combining a first signal processing circuit having a lower data discriminating capability and a second signal processing circuit having a higher data discriminating capability, providing a reliability detecting circuit for extracting a data reliability at the time of data discrimination by the first signal processing circuit, and operating the second signal processing circuit adaptively in accordance with the extracted reliability.

In a data discriminating process of the present invention, the first signal processing circuit having a lower data discriminating capability is operated while the second signal processing circuit having a higher data discriminating capability is operated, as required. The reliability detecting circuit detects the deterioration in reliability of data discrimination by the first signal processing circuit and the second signal processing circuit starts and completes its data discriminating operation on the basis of the result of detection by the reliability detecting circuit.

In the present invention, the second signal processing circuit demodulates data for which the data discriminating performance of the first signal processing circuit is insufficient. Therefore, the overall data reproducing performance is approximately represented by the data discriminating performance of the second signal processing circuit. Regarding a power consumption, on the other hand, the operating period of the second signal processing circuit having a large power consumption is limited to only a required time. Therefore, the power consumption of the overall data demodulator is approximately determined by the first signal processing circuit.

The above object of the present invention is achieved by the data demodulating system mentioned above.

According to the present invention, a remarkable reduction in power consumption of a signal processing circuit with a high-efficiency decoding performance kept is made possible by effectively utilizing the barometer of a data reliability proposed by a connection code scheme.

A specific effect will be estimated in regard to a data demodulating system in which a switching is made between a PRML system and an EPRML system. In the case where a code error rate is about $10^{-4}$ which may be regarded as the lower limit of a code error rate usually allowed in a magnetic disk device, the rate of a likelihood difference $\Delta nk$ falling within this setting range comes to about $10^{-3}$. Namely, the activation of EPRML only one time for 1000 bits suffices. When an EPRML processing circuit is activated once, the processing is performed for a period of about 50 bits. The operation rate of the EPRML processing circuit results in about $\frac{1}{100}$ and a power consumption is correspondingly reduced.

As compared with the PRML system, the EPRML system has an estimated improvement of S/N equal to or greater than about 2 dB in the case where the ratio of the half band width of the reversal of regenerative isolated magnetization of a magnetic recording device to the half band width of a record signal is about 2.5 falling within a range in which the device is put into practice. Accordingly, when the above processing is performed, the effect of improvement of S/N equal to or greater than 2 dB as compared with the PRML system approximately equivalent to a decoding system based on the EPRML system can be achieved with a power consumption which is approximately equal to that in the PRML system.

BRIEF DESCRIPTION OF THE DRAWINGS

FIGS. 4A and 4B show examples of detection of data reliability information;

FIG. 5 shows the classification of data reliability information detecting equations;

FIG. 17 is a diagram showing the concept of a data demodulating method in a general magnetic disk device or the like.

DESCRIPTION OF THE PREFERRED EMBODIMENTS

A data demodulating system based on the splice or combination of a PRML system and an EPRML system, as an embodiment of the present invention, will now be described in detail with data of a 8/9GCR (Group Coded Recording) (0, 4/4) code taken as an example.

Figure 2A:
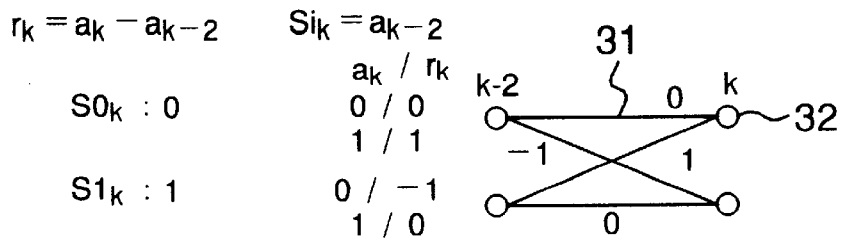
FIGS. 2A and 2B show PRML and EPRML trellis diagrams.
Figure 2B:
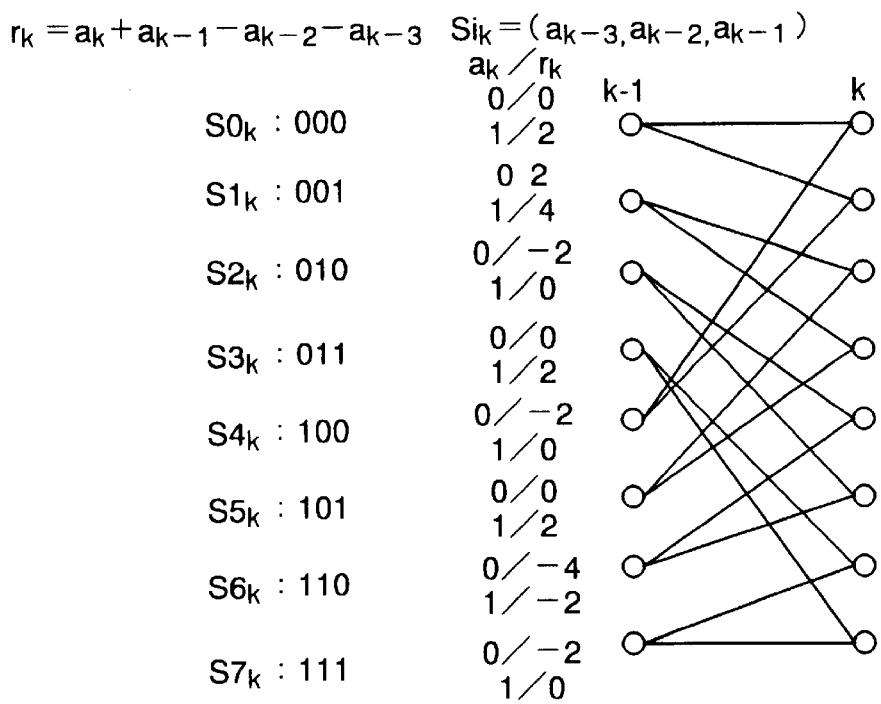

Before showing the details of a data demodulating circuit, the principle of operation of each of the PRML and EPRML systems and a method for extracting data reliability information will be described in detail. As well known, the operation of each of a PRML signal processing system and an EPRML signal processing system can be explained using a trellis diagram. FIGS. 2A and 2B show the trellis diagrams of both the systems. In the figure, reference symbol ak represents an input signal to PRML or EPRML at an instant of time k. Herein, reference numeral 32 denotes a state and numeral 31 denotes a state transition. The upper and lower sides of a label (ak/rk) indicate input and output signal values, respectively.

A state of each signal processing system is determined by the previous input signal series. In the case of the PRML system, the present signal level is influenced by only an input signal ak−2 preceding the present signal by two time slots. Therefore, the number of states S is 2. Provided that a state at time k is represented by Sik, the state Sik is represented by Sik=(ak−2|ak(1, 0)). In the case of the EPRML system, the present signal level is influenced by the previous signals extending three time slots. Therefore, a state at time k is represented by Sik=((ak−3, ak−2, ak−1)|ak(1, 0)) and the number of states is 8.

The basic operation of the PRML system will be described. State transitions originating from a plurality of states at time k−2 converges into a certain specified state at time k. For these state transitions, the second power of a difference between an output signal indicated in the lower side of each label and an input signal is called a branch metric. Also, the accumulated value of branch metrics for each state up to the present instant of time is called a path metric. Only that state transition among state transitions converging into the certain specified state at the instant of time k in which the sum of a path metric up to time k−2 and a branch metric corresponding to each state transition takes the smallest value, is selected as a state transition (or path) which satisfies the maximum likelihood (or highest probability) condition.

The above process is divided into the following steps. Namely, a path metric and a branch metric are added (Add). Next, the values of addition for respective states are compared (Compare) to select a state transition which provides the minimum value (Select). This series of operations is abbreviated to ACS. The maximum likelihood decoding is a method in which the ACS operation is repeated for each instant of time and each state so that data is decided at a point of time when paths ultimately converges into one on the trellis diagram.

Figure 3:
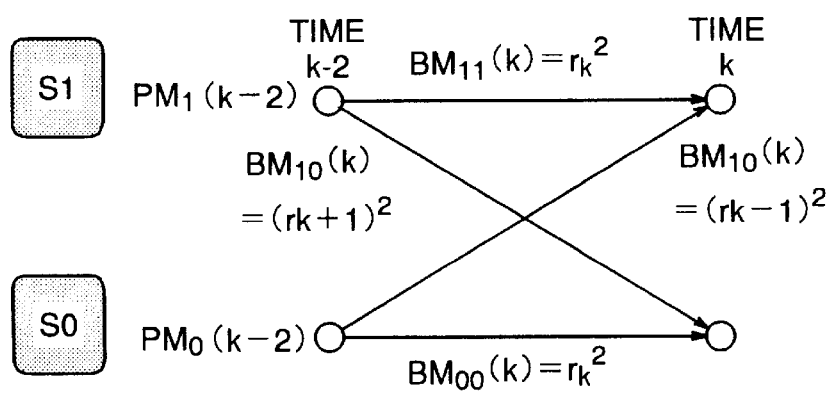
FIG. 3 shows the details of the PRML trellis diagram.

An example of ACS for PRML will be described in detail by use of FIG. 3. A path metric and a branch metric at time k are denoted by PMn(k) and BMnm(k), respectively. The suffix represents a state. PMn(k) is given by the following equations:

$$PM1(k)=\min\{PM1(k-2)+BM11(k), PM0(k-2)+BM01(k)\} \quad (1)$$

$$PM0(k)=\min\{PM1(k-2)+BM10(k), PM0(k-2)+BM00(k)\} \quad (2)$$

where a min( ) function gives the minimum value in an argument.

Such an operation is repeated and an ultimately surviving path (or survival path) gives the maximum likelihood data.

Though the EPRML system has the number of states (or 8) increased as compared with that (or 2) in the PRML system, the basic operation and data demodulating method for EPRML system are the same as those for PRML system.

Next, description will be made of a method for extraction of data reliability information which is a key subject of the present invention. At any instant of time k, the reliability RLB(k) of a selected path is obtained in accordance with a procedure which will be mentioned hereinbelow. The reliability herein referred to indicates the degree of matching of decided data with the original data. For the convenience of explanation, the manner of determination of the reliability RLB(k) will be described in detail by use of trellis diagrams for PRML system shown in FIGS. 4A and 4B by way of example.

A difference signal of each state transition at each instant of time and each state (that is, likelihood difference signal) is defined by $$\Delta 1(k)=\text{abs}\{PM1(k-2)+BM11(k)\}-\{PM0(k-2)+BM01(k)\} \quad (3)$$

$$\Delta 0(k)=\text{abs}\{PM1(k-2)+BM10(k)\}-\{PM0(k-2)+BM00(k)\} \quad (4)$$

where an abs( ) function gives the absolute value of an argument and the value of k in the parenthesis ( ) represents an instant of time.

In FIG. 4A, it is assumed that a state transition from a state 1 is generated at time k0 and a state transition from a state "0" is generated at time k12. In this case, it should be noted that a likelihood function corresponding to a new state transition starts from time k4. Likelihood functions at times k0 and k2 are calculated from path branches before time k0.

$\Delta 1(k4)$ at time k4 is determined from a metric difference of a signal through a path of $S\{k0, k2, k4\}=\{1, 1, 1\}$ or $S\{k0, k2, k4\}=\{1, 0, 1\}$. Also, $\Delta 0(k4)$ is determined from a metric difference of a signal through a path of $S\{k0, k2, k4\}=\{1, 1, 0\}$ or $S\{k0, k2, k4\}=\{1, 0, 0\}$. Similarly, $\Delta 1(k14)$ is determined from a metric difference of a signal through a path of $S\{k0, k2, k4, - - -, k14\}=\{1, 1, - - -, 1, 1\}$ or $S\{k0, k2, k4, - - -, k14\}=\{1, 0, - - -, 0, 1\}$. $\Delta 0(k14)$ is determined from a metric difference of a signal through a path of $S\{k0, k2, k4, - - -, k14\}=\{1, 1, - - -, 1, 0\}$ or $S\{k0, k2, k4, - - -, k14\}=\{1, 0, - - -, 0, 0\}$. In the shown example, since a branch from a state "0" is selected at time k12, $\Delta 0(k2), - - -, \Delta 0(k12)$ are selected as difference signals. In the figure, it is assumed that the dotted line is not selected.

In FIG. 4B, it is assumed that a state transition from a state "1" is generated at time k0 and a state transition is generated for a receive signal at time k2 immediately after time k0. In this case, too, the likelihood function is similarly determined. Namely, $\Delta 1(k4)$ at time k4 is determined from a metric difference of a signal through a path of $S\{k0, k2, k4\}=\{1, 1, 1\}$ or $S\{k0, k2, k4\}=\{1, 0, 1\}$. Also, $\Delta 0(k4)$ is determined from a metric difference of a signal through a path of $S\{k0, k2, k4\}=\{1, 1, 0\}$ or $S\{k0, k2, k4\}=\{1, 0, 0\}$.

In FIG. 5, operational equations giving those likelihood differences $\Delta n(k)$ are classified. In the PRML signal processing system, since each of a start end and a terminal end involves two states, four combinations in total are yielded. A likelihood function immediately after a path branch, that is, in an initial state is given by the following equation:

$$PL(k0)=1/\{2\{1+\exp(\Delta n(k0)\}\} \quad (5)$$

With this taken as the initial state, a reliability RLB(k) each time a receive signal is inputted to the PRML signal processing circuit is given by such a repetitive form as shown by the following equation:

$$PLB(kn)=\{1-PL(kn-2)\}PL(kn)+PL(kn-2)\{1-PL(kn)\}. \quad (6)$$

It is meant that as the value of PLB(k) is smaller, the possibility of selection of a correct path is higher. When the reliability is deteriorated, the value of RLB(k) approaches a limit value ½. It is understood from equation (6) that RLB(k) is substantially determined by a larger value of PL(k). Also, it is understood from equation (5) that PL(k) is determined by $\Delta n(k)$. Accordingly, data reliability information, that is, the reliability of selection of a correct path on the trellis diagram is approximately determined by the minimum value of $\Delta n(k)$. Namely, it is meant that as two path metric differences are closer to each other, the reliability of a selected path is lower.

Figure 1:
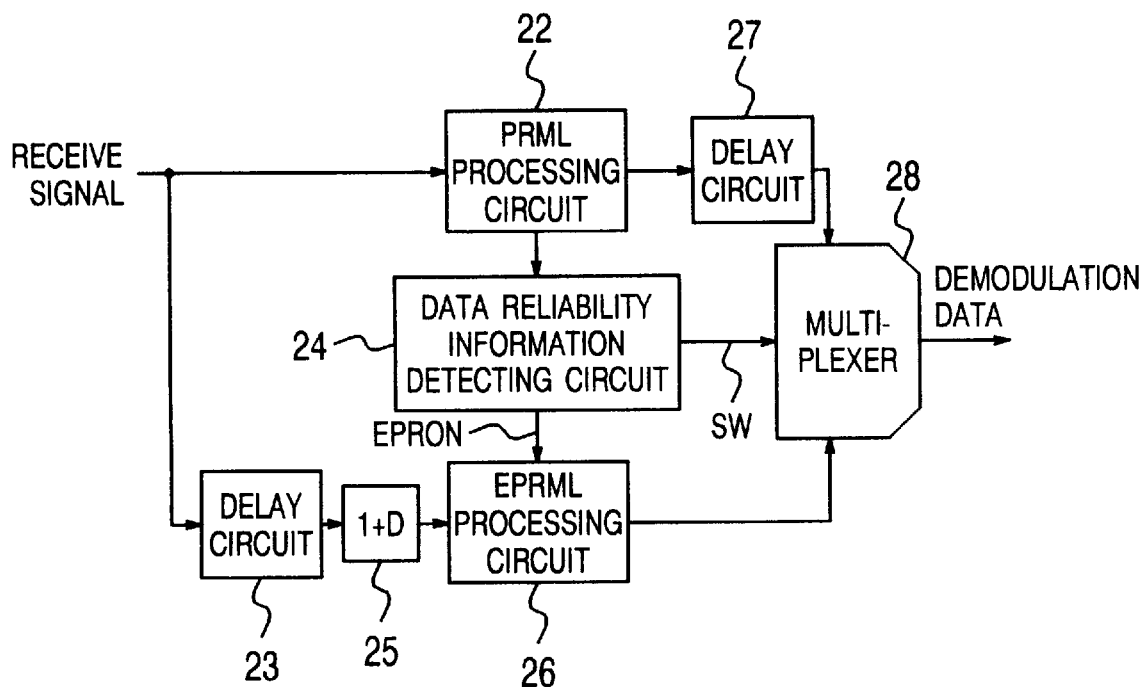
FIG. 1 is a block diagram showing an embodiment of a data demodulating circuit of the present invention.

On the basis of the above-mentioned data reliability information, a data reliability information detecting circuit 24 shown in FIG. 1 performs an operation based on the values of two path metric differences $\Delta n(k)$ shown by equations (3) and (4).

First, reference will be made to the range of distribution of $\Delta n(k)$. In the case where a receive signal through a recording/reproducing path is affected by noises, the receive signal takes any value of (1, −1, 0) as shown by the trellis diagram shown in FIG. 2A and the polarity of a receive signal rk at the time of state change is determined. Therefore, the value of $\Delta n(k)$ comes to 1 or 0 from decision equations shown in FIG. 5.

On the other hand, in the case where Gaussian noises are superimposed in the recording/reproducing path, a receive signal (ri, rk) assumes a Gaussian distribution centering around {1, 0, −1} and hence the value of $\Delta n(k)$ takes a Gaussian distribution centering around 1 or 0.

Figure 6:
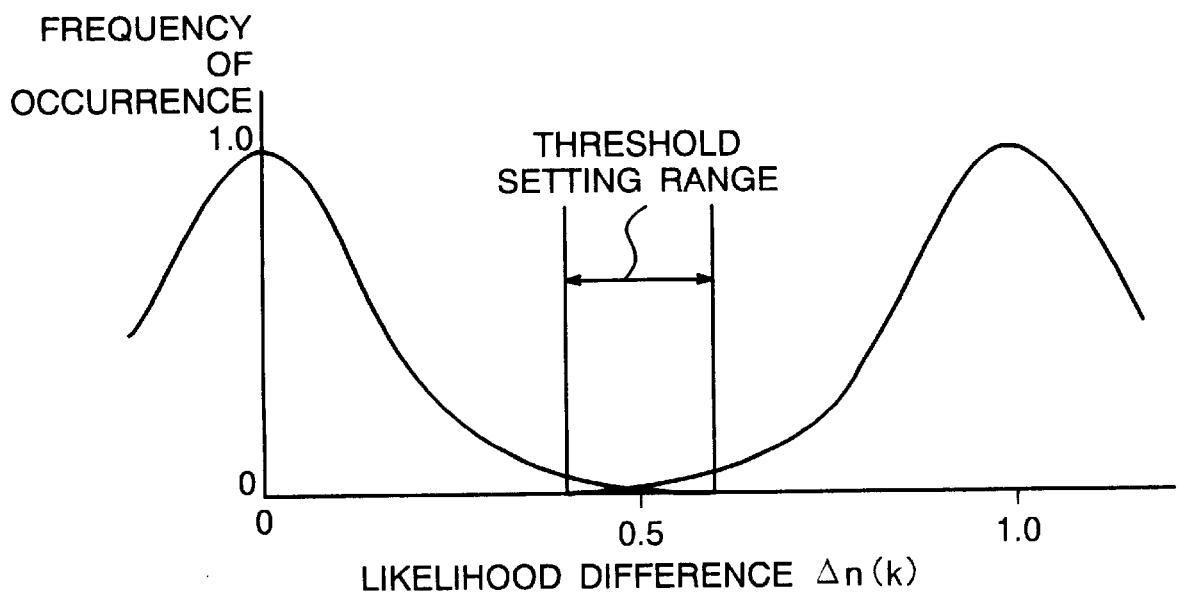
FIG. 6 shows a reliability detection range for the distribution of PRML likelihood differences in the present invention.

A schematic diagram of the distribution of $\Delta n(k)$ is shown in FIG. 6. In the figure, $\Delta 0$ represents a likelihood difference of a state "0" and $\Delta 1$ represents a likelihood difference of a state "1". The shown distribution means that in the case where $\Delta n(k)$ to be 0 in itself becomes larger than 0.5 due to the influence of noises, a decision error occurs in the PRML process. On the other hand, in the case where $\Delta n(k)$ to be 1 in itself becomes smaller than 0.5 due to the influence of noises, there similarly results in that a decision error occurs in the PRML process. Accordingly, a data portion distributed in the vicinity of $\Delta n(k)=0.5$ has a higher decoding error and the rate of occurrence of a decoding error is exponentially decreased as $\Delta n(k)$ gets near 1 or 0. Thus, a threshold having a certain range centering around $\Delta n(k)=0.5$ can be set so that the reliability of data is regarded as being low in the case where the value of $\Delta n(k)$ falls within the threshold setting range. Namely, data included in the setting range has a high possibility that it involves a code error. However, it should be noted that data included in the setting range has not only erroneous data with code error but also correct data in itself and the amount of correct data is larger than that of erroneous data.

Though the above-mentioned data reliability extracting method has been shown in conjunction with the PRML system, it is needless to say that the same holds for another signal processing system.

Other methods will be shown as barometers which give the data reliability. First, there will be shown a method for giving the data reliability by detecting the unconvergence of survival paths.

In general, the original data is coded in order to converge survival paths of a data demodulating circuit in a fixed period of time. The explanation will be made in conjunction with an example in which the coding is made in the 8/9GCR (0, m/h) (m=4, h=4) shown in the present embodiment. "GCR" is an abbreviation of Group Coded Recording. Here, m represents the maximum number (or run length) of continuous bits of 1 or 0 after encoding and h represents the maximum number of continuous 1's or 0's when bits after encoding are seen every two bits.

Figure 7A:
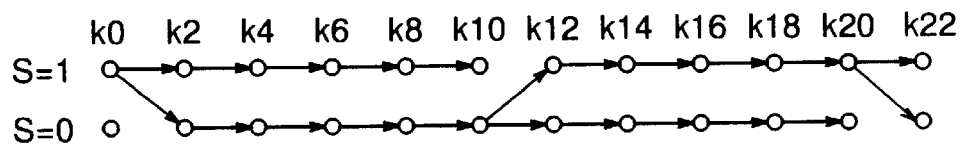
FIGS. 7A and 7B show examples of transition in the PRML trellis diagram.
Figure 7B:
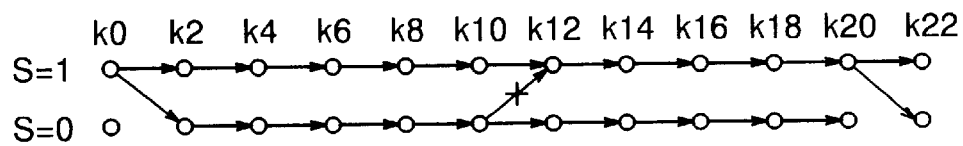

The states of survival paths in the PRML system using the (0, 4/4) code are shown in FIGS. 7A and 7B. In the case where the S/N of a receive signal is satisfactory, survival paths on the trellis diagram converge into one path one time at intervals of 11 bits at the maximum (k0 to k10) by an interleaving process in which the operation is performed every three bits of receive data, as shown in FIG. 7A. Therefore, the path memory length of the PRML demodulating circuit is limited to 10 bits. (Since the operation is performed in an interleaved manner, the path memory length of each PRML demodulating circuit is 5 bits.)

On the other hand, consider the case where a state transition as shown in FIG. 7B is assumed at time k12 due to noises so that an error is generated as for demodulation data. Since the state transition at time k12 is not generated, the path memory length is short at and after time k14. Though any data is erroneous as for demodulation data, it is shown that a data reliability can also be realized by detecting the unconvergence of survival paths as the data reliability. Such a data reliability detecting method makes it possible to generate a data reliability quickly as compared with the above-mentioned method using path metric differences.

For example, in the above-mentioned method using path metric differences, a demodulation error in the maximum bit period of times k0 to k21 having two settled trellis transitions at opposite ends in the (0, 4/4) code is detected at time k22. On the other hand, in the method using the path memory length, the demodulation error is detectable at time k14. As a result, it is possible to reduce the circuit scale of delay circuits 23 and 27 (which will be mentioned later on) and to shorten the delay of processing for demodulation data.

Next, a method of detecting data having no matching with a coding rule will be shown as another barometer for giving the data reliability will be shown. In the 8/9GCR code, 9-bit data is assigned to 8-bit input data. Though a bit series of 9 bits includes 512 kinds of representable combinations, 256 kinds matching with the coding rule are selected from among the 512 kinds to perform the encoding. On the other hand, in a decoder for decoding data, 9-bit data demodulated by a data demodulating circuit is converted into 8-bit decode data. The detection of the erroneousness of data demodulated by the data demodulating circuit is effected by detecting the absence of the demodulation data of the data demodulating circuit in the 9-bit data series determined by the encoder for the 8-bit input data. Thus, an abnormality in data series at the time of encoding can also be given as a data reliability.

The plurality of barometers for data reliability as mentioned above may be operated independently or in combination.

An embodiment of a data demodulating circuit using the above-mentioned data reliability is shown in FIG. 1. A receive signal of the data demodulating circuit includes the addition of transmit data (or original data) transmitted from a host computer (not shown) and noises mixed as the result of the passing through a recording/reproducing path of a magnetic disk, a reproducing amplifier or the like. In the data demodulating circuit, this receive signal is divided into two series one of which is supplied to a PRML processing circuit 22 and the other of which is supplied to an EPRML processing circuit 26 through the delay circuit 23 which has a proper length or delay and a (1+D) circuit 25 which performs signal conversion.

The delay circuit 23 is provided for absorbing a data delay caused by the PRML processing circuit 22 and a detection delay of the data reliability information detecting circuit 24. The detection delay of the data reliability information detecting circuit 24 corresponds to that time delay depending upon the receive signal which is caused because the reliability of a selected path is provided at an instant of time when the above-mentioned data reliability information converges into one survival path. For example, in the case of FIG. 4A, a data reliability from time k0 to time k12 is obtained at time k14. Therefore, it is necessary for the delay circuit 23 to absorb the detection delay of the data reliability information detecting circuit 24.

Since the receive signal inputted to the data demodulating circuit is a signal for PRML system, the (1+D) circuit 25 converts the receive signal of the PRML system into a receive signal for EPRML system.

The data reliability information detecting circuit 24 obtains desired data for reliability decision by use of a part of the above-mentioned likelihood decision information of the PRML processing circuit 22 to generate a switching control signal SW and an EPRML processing circuit activation signal EPRON.

The delay circuit 27 is provided for correcting a deviation in timing of demodulation data between the EPRML processing circuit 26 and the PRML processing circuit 22 which is caused by a data demodulation time of the EPRML processing circuit 26 and so forth.

A multiplexer 28 makes a switching between an output of the delay circuit 27 and demodulation data of the EPRML processing circuit 26 in accordance with the switching control signal SW.

The EPRML processing circuit activation signal EPRON is issued, for example, in the case where the reliability of data demodulated by the PRML processing circuit 22 is deteriorated.

The switching control signal SW is generated in a period of time when the data reliability of the PRML processing circuit 22 is low or data has a high possibility of occurrence of a discrimination error. The signal SW performs the replacement of demodulation data of the PRML processing circuit 22 in such a period by demodulation data of the EPRML processing circuit 26.

The period for the replacement of demodulation data of the PRML system by demodulation data of the EPRML system will be explained by virtue of FIGS. 7A and 7B. For the explanation of the demodulation data replacement period, it is necessary to explain the coding of the original data. As mentioned above, in the PRML system using the (0, 4/4) code, survival paths on the trellis diagram converges into one path one time at intervals of 11 bits at the maximum (k0 to k10), as shown in FIG. 7A.

Now consider the case where a state transition at time k10 is not generated, as shown in FIG. 7B. In this case, decode data in the maximum bit period of times k0 to k21 having two settled trellis transitions at opposite ends is erroneously demodulated. At the same time, the state of a metric difference $\Delta n(k)$ or the suffix n is settled to "0" or "1" at time k20 so that the decision of a data reliability becomes possible. Accordingly, the replacement by demodulation data of the EPRML system activated by one data reliability deterioraion can be performed with demodulation data of the PRML system in the 21-bit period being made an object of replacement.

Generally, in the case where a (0, m/h) code is used, data of 4(h+1)+1 points may be replaced by EPRML data from a similar point of view. As mentioned in the foregoing, it is required that a section of data to be replaced by demodulation data of the EPRML system should be selected corresponding to the coding. Also, it is needless to say that the present detecting system is effective even in the case where a plurality of errors in trellis transition occur in the above-mentioned period.

Figure 8:
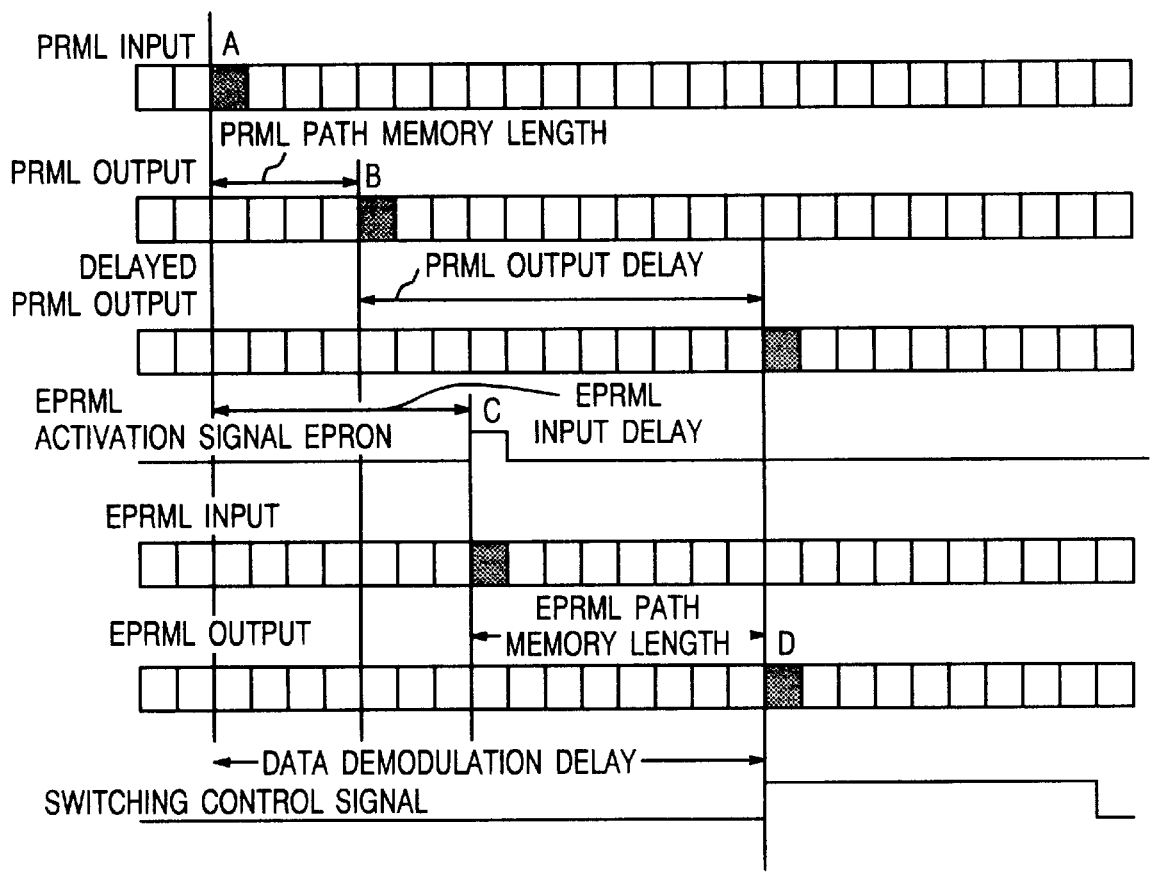
FIG. 8 is a timing chart of the data demodulating circuit of the present invention.

The operation of the above data decoder will be explained by use of a time chart shown in FIG. 8. When a receive signal is applied to an input of the PRML processing circuit 22 at an instant of time indicated by A in FIG. 8, output data delayed by the length of the path memory of the PRML processing circuit 22 is obtained at an instant of time B. An EPRML processing circuit activation signal EPRON as an output of the data reliability information detecting circuit 24 is generated at a timing of an instant of time C even with the maximum delay. A delay amount for an input signal of the EPRML processing circuit 26 to be provided by the delay circuit 23 is determined by a used conversion code, as mentioned earlier. In the (0, 4/4) code, the delay of 22 bits is necessary. Accordingly, a point indicated by the instant of time C in FIG. 8 is an instant of time of signal input to the EPRML processing circuit 26. Further, output data of the EPRML processing circuit 26 is delayed by the length of a path memory thereof and is outputted at an instant of time D. Output data of the PRML processing circuit 22 is subjected by the delay circuit 27 to timing adjustment for the output data of the EPRML processing circuit 26 obtained at the instant of time D. A switching control signal SW as an output of the data reliability information detecting circuit 24 takes a turned-on condition during the above-mentioned data replacement period so that PRML demodulation data is replaced by EPRML demodulation data.

Numeric values such as specific delay times mentioned above are given by way of example. If the coding method differs, a change to proper numeric values is necessary. Also, the timing adjustment is necessary depending upon the delays of the PRML and EPRML circuits (including the delay of a pipe-line processing) or a different data reliability detecting method. According to circumstances, the timing of generation of the EPRML processing circuit activation signal EPRON or the switching control signal SW is different. Therefore, it is needless to say that the circuit should be constructed taking those timings into consideration.

Next, embodiments of main constituent elements including the PRML processing circuit, the EPRML processing circuit and the data reliability information detecting circuit will be shown hereinbelow.

Figure 9:
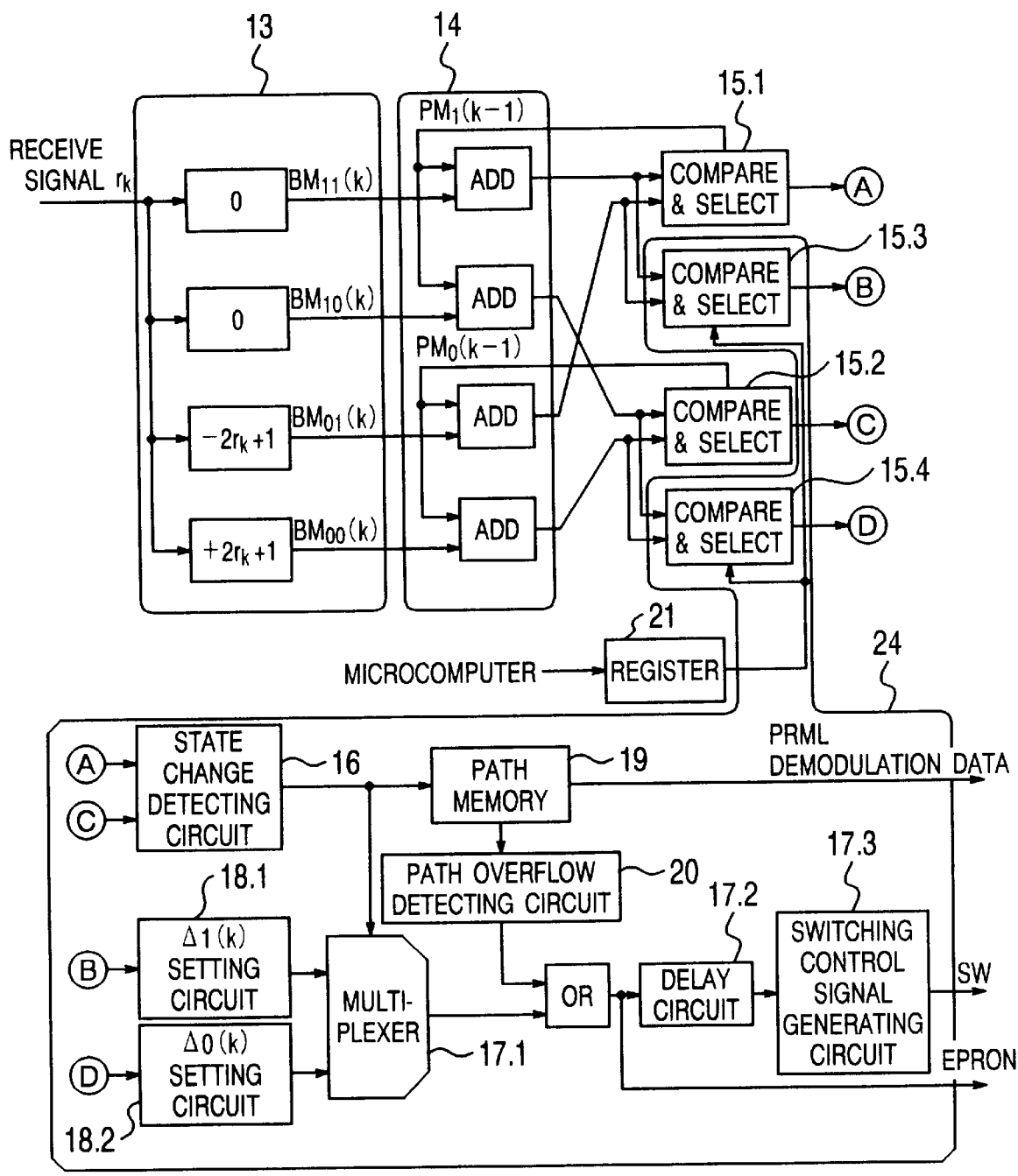
FIG. 9 shows an example of the construction of a data reliability detecting circuit in PRML.

One embodiment of the PRML processing circuit 22 and the data reliability information detecting circuit 24 is shown in FIG. 9. The following description will be made assuming that a data reliability in the present embodiment is given by use of the likelihood differences of two states of the PRML processing circuit and the indication of a path memory length as being larger than a predetermined value. The PRML processing circuit 22 is basically composed of a branch metric operating circuit 13, an adder circuit 14 and a compare and select circuit 15. The branch metric operating circuit 13 generates numeric values BM11(k), BM01(k), BM00(k) and BM10(k) corresponding to four branches shown in FIG. 3. The compare and select circuit 15.1 and 15.2 perform an ACS operation for data demodulation. Namely, path metrics PM1(k−1) and PM0(k−1) and branch metrics BM11(k), BM01(k), BM00(k) and BM10(k) are added by the adder circuit 14, the comparison in magnitude between the results of addition is made, and path metrics PM1(k) and PM0(k) newly updated in accordance with the results of selection are outputted. A path memory 19 determines a survival path from signals obtained through the processing of the outputs of the compare and select circuit 15.1 and 15.2 by a state change detecting circuit 16 to generate demodulation data.

The data reliability information detecting circuit 24 gives the reliability of demodulation data by virtue of a reliability which is formed by the compare and select circuits 15.3 and 15.4, setting circuits 18.1 and 18.2, the state change detecting circuit 16 and a multiplexer 17.1 and uses the likelihood differences of two states and a reliability which is formed by a path memory overflow detecting circuit 20 and indicates that the path memory length is larger than the predetermined value. The compare and select circuits 15.3 and 15.4 are used for judging whether or not the two likelihood differences fall within a threshold indicated by a register 21, and the likelihood differences of two states are outputted as a first reliability by the setting circuits 18.1 and 18.2, the state change detecting circuit 16 and the multiplexer 17.1.

The path memory overflow detecting circuit 20 counts an interval from the generation of a state transition to the reconvergence of survival paths so that an overflow pulse OVF is generated and outputted as a second reliability in the case where the count value exceeds a predetermined constant value (5 in the present embodiment).

The EPRML activation signal EPRON is generated as a signal produced by a logical sum of the overflow pulse OVF and an output of the multiplexer 17.1 and serves as a signal for activating the EPRML processing circuit. The switching control signal SW is a control signal of a fixed period generated by a switching control signal generating circuit 17.3 which is triggered by a version of the EPRML activation signal EPRON delayed in a delay circuit 17.2 by a data demodulation time of the EPRML processing circuit 26. The value of the register 21 is freely set from the exterior by a microcomputer.

Figure 10:
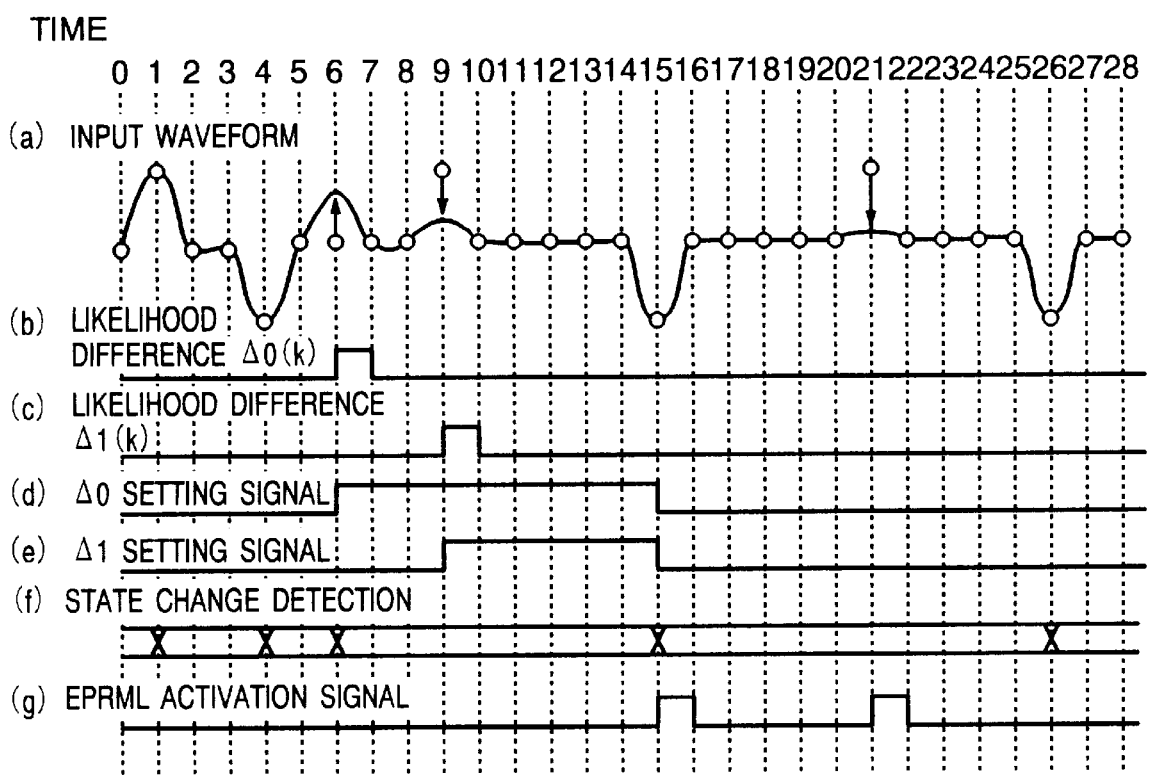
FIG. 10 (including subparts a–g) is a timing chart of the operation of the data reliability detecting circuit shown in FIG. 9.

The timing of operation of the PRML processing circuit 22 and the data reliability information detecting circuit 24 of FIG. 9 mentioned above will be described in detail by use of FIG. 10. A waveform shown in (a) of FIG. 10 represents an input signal to the PRML processing circuit 22. The receive signal of the PRML processing circuit assumes a waveform including three values of (+1, 0, −1), as shown in (a) of FIG. 10. This waveform shows an example in which a signal amplitude at time 9 to indicate the polarity of +1 in itself is deteriorated due to the influence of noises or the like whereas a signal amplitude at time 6 rises to a positive polarity. In the case where the results of judgement by the compare and select circuits 15.3 and 15.4 for likelihood differences exist in the threshold setting range, a signal indicating the deterioration of the reliability is generated as a first reliability, as shown in (b) and (c) of FIG. 10. These signals cause the setting circuits 18.1 and 18.2 to generate setting signals as shown in (d) and (e) of FIG. 10. Further, when a path is settled by the state change detecting circuit 16 (see (f) of FIG. 10), the output signals of the setting circuits 18.1 and 18.2 are latched in accordance with the state of the path so that an EPRML activation signal as shown at time 15 in (g) of FIG. 10 is generated if the latched signal has a high level. A switching control signal SW (not shown) is generated for a fixed period of time on the basis of the EPRML activation signal, as shown in the foregoing.

On the other hand, in the case where a signal amplitude of +1 at time 21 is deteriorated due to the influence of noises or the like, as shown in FIG. 10, an overflow pulse OVF is generated and outputted as a signal representative of a second reliability at time 21, that is, at an instant of time when a path memory length of the PRML (for example, five samples) is exceeded from a state transition generated at time 15. Like the reliability information using the likelihood differences, the overflow pulse OVF is outputted as an EPRML activation signal EPRON which in turn generates a switching control signal SW for a fixed period of time.

Figure 11:
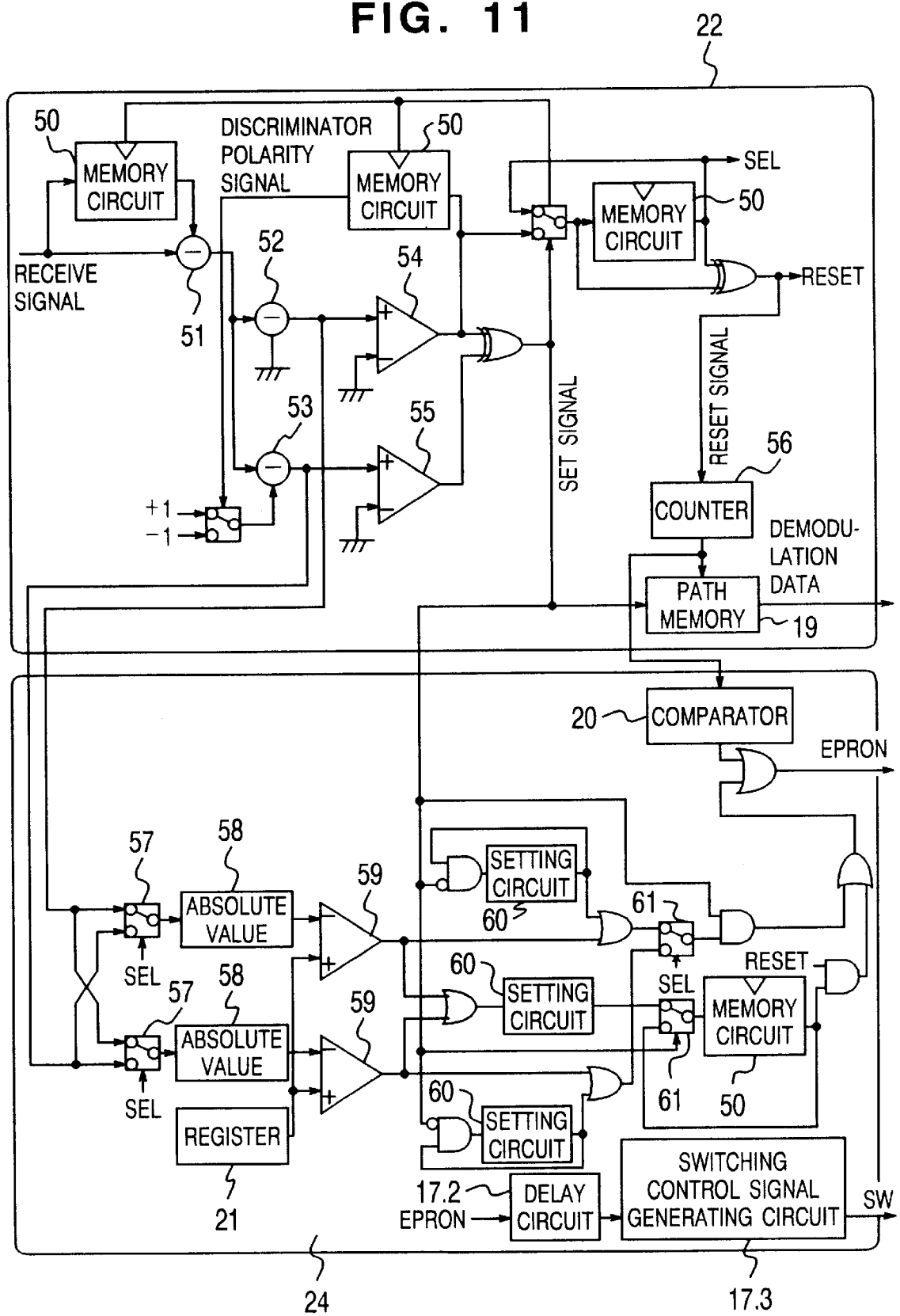
FIG. 11 shows an example of the construction of another data reliability detecting circuit in PRML.

FIG. 11 shows another embodiment of the PRML processing circuit 22 and the data reliability information detecting circuit 24. The present embodiment corresponds to an example of the construction in the case where the PRML processing circuit 22 is simplified as compared with that shown in FIG. 9. Like the case of FIG. 9, it is assumed that a data reliability is given by use of the likelihood differences of two states of the PRML processing circuit and information indicating that a path memory length is larger than a predetermined value. The construction of the PRML processing circuit 22 is simpler than that shown in FIG. 9 but the basic operation thereof is the same. A memory circuit 50 stores a receive signal in the case where a reset signal is generated. The memory circuit 50 corresponds to a path metric value. Operating circuits 51, 52 and 53 perform the addition of the path metric value and a branch metric value and the generation of a likelihood difference at each state. Comparators 54 and 55 perform a path selection based on the likelihood difference and generate a reset signal to a path memory counter 56 and so forth and a set signal to a path memory 19. The data reliability information detecting circuit 24 receives the results of operation by the operators 52 and 53 as basic information of likelihood differences from the PRML processing circuit 22 to obtain information of a data reliability. The likelihood difference of each state is obtained by selecting the results of operation of the operators 52 and 53 by use of multiplexers 57 on the basis of sel signals. Thereafter, an operation processing based on equations (3) and (4) is performed by absolute value circuits 58 and comparator circuits 59. The comparator circuit 59 compares a numeric value of a register 21 and the likelihood differences of two states to generate a signal which is turned on when a condition is satisfied. Setting circuits 60 detect the likelihood differences of two states in a detection period from the generation of a path branch. Multiplexers 61 selects which of the likelihood differences of two states should be outputted as a reliability. As a result, a first reliability for an EPRML activation signal is generated.

On the other hand, a path memory overflow detecting circuit 20 is a circuit for judging whether or not the path memory counter 56 is over a path memory length. In the case where the path memory counter 56 is over 5, the path memory overflow detecting circuit 20 generates an overflow pulse OVF to obtain a second reliability. As in the foregoing embodiment, the EPRML activation signal EPRON is a signal produced by a logical sum of the overflow pulse OVF and an output of the multiplexer 61 and serves as an activation signal for the EPRML processing circuit. A switching control signal SW is a control signal generated in a fixed period of time by a switching control signal generating circuit 17.3 which is triggered by a version of the EPRML activation signal EPRON delayed in a delay circuit 17.2 by a data demodulating time of the EPRML processing circuit 26. The switching control signal SW operates to replace demodulation data of the fixed period by demodulation data of the EPRML processing circuit 26.

Even with the construction of the PRML processing circuit other than those shown in the foregoing embodiments, a data reliability can be generated easily by the above-mentioned method.

Figure 12:
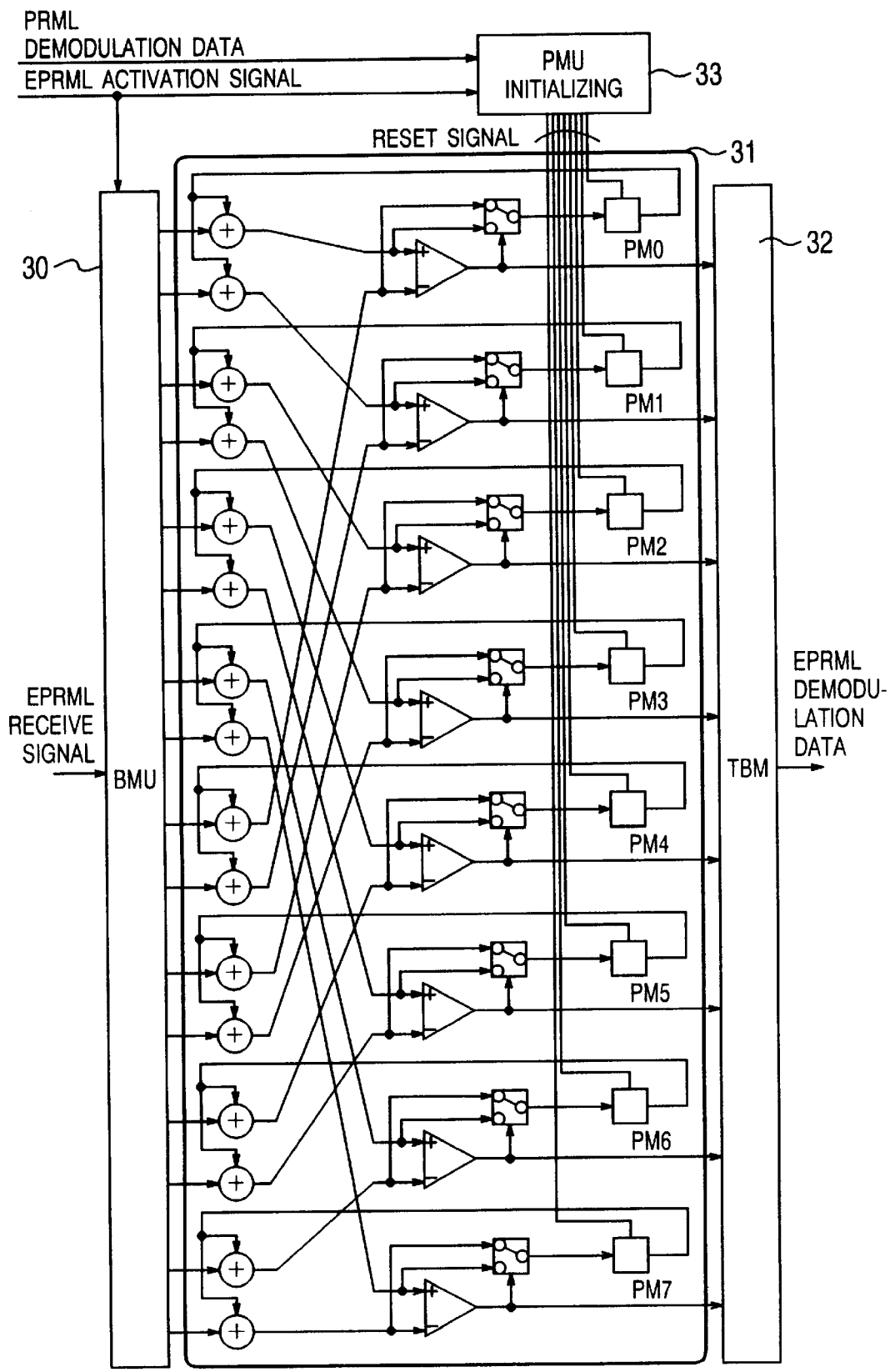
FIG. 12 shows an example of the construction of an EPRML processing circuit.

Next, an embodiment of the EPRML processing circuit 26 will be shown in FIG. 12 and the construction thereof will be described. The EPRML processing circuit 26 is composed of a branch metric generating section 30, an ACS circuit 31 and a path memory 32 and has a circuit construction based on the EPRML trellis diagram shown in FIG. 2B. The branch metric generating section 30 provides the branch metric of a state transition generated from each state of the EPRML trellis diagram. The ACS 31 performs the addition of path metrics BM0(k−1) to BM7(k−1) of eight states and branch metric values at a present instant of time, comparison and selection to generate a path metric value for a path having the highest probability. The path memory 32 performs the generation of decode data on the basis of the result of comparison for each state. In order to control the whole of the EPRML processing circuit 26 by an EPRML activation signal EPRON, the initial values of path metrics PM0 to PM7 are controlled. After the generation of an EPRML activation signal EPRON pulse, the initial values of path metrics BM0(k−1) to BM7(k−1) are given by a path metric initializing circuit 33. The path metric initializing circuit 33 makes only one of eight reset signals active on the basis of PRML demodulation data corresponding to the timing of generation of the EPRML activation signal. This reset signal is a path metric initializing signal which makes only one of the path metric values of eight states smaller than the other path metric values. With this reset signal, a path metric value at the time of activation of the EPRML processing circuit is started from one of the eight states having the highest probability and the subsequent data demodulation becomes possible with the matchability in data demodulation with the PRML processing circuit being kept.

A path metric initializing method for EPRML processing circuit other than the construction in the above-mentioned embodiment includes a method in which the path metric value is initialized by an EPRML receive signal. This can be realized by removing the path metric initializing circuit 33 shown in FIG. 12 and merely connecting the EPRML activation signal to a path metric value initializing signal of each state, which will has no need of illustration. With this construction, the path metric values of the respective states are all initialized as the same value and the path metric value of each state at the time of input of an EPRML activation signal is determined by an EPRML receive signal before the EPRML activation signal is inputted. In the case of the (0, 4/4) code, this is realized by increasing the delay time of the delay circuit 23 (see FIG. 1) by 10 samples. According to the path metric initializing method in the present embodiment, the path metric initializing circuit can be simplified with the realization of reduction in circuit scale and reduction in power consumption but an EPRML receive signal of 2(h+1) samples at the maximum in the case of (0, m/h) code is required prior to the EPRML activation signal. This means an increase in delay time of the delay circuit 23. As a result, the circuit scale and the power consumption of the delay circuit 23 are increased. Accordingly, the circuit scale and the power consumption of the whole of the data demodulating circuit are determined by the reduction in circuit scale of the initializing circuit and the increase in delay time of the delay circuit, that is, by coding.

Figure 13:
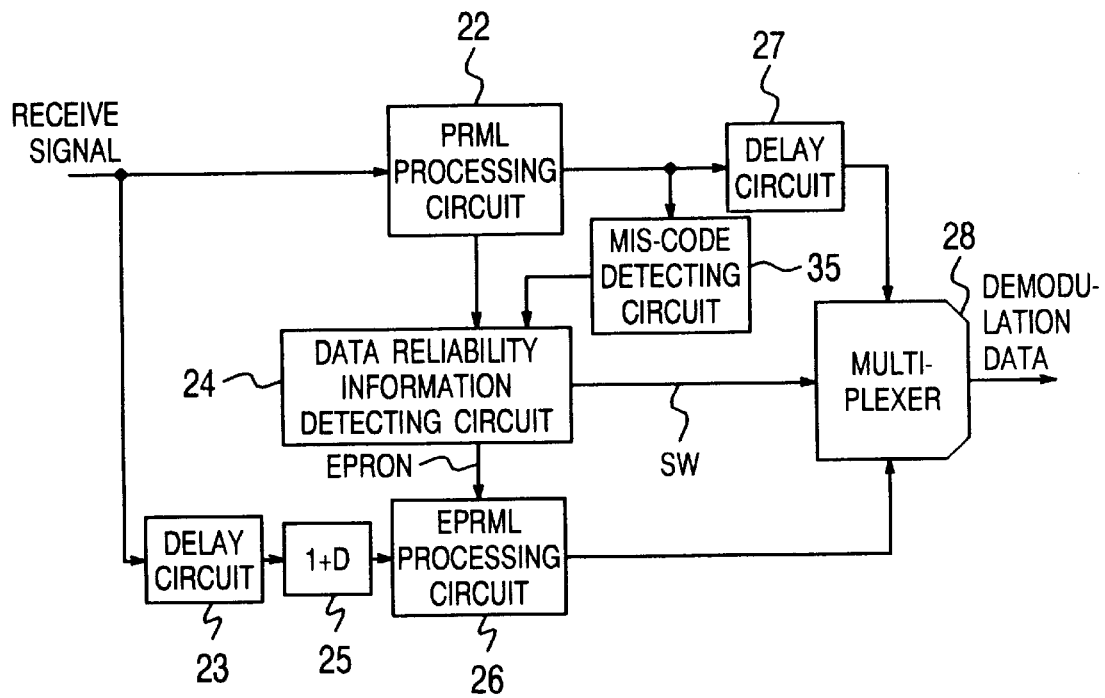
FIG. 13 is a block diagram showing another embodiment of the data demodulating circuit of the present invention.

Next, an embodiment of giving a data reliability on the basis of demodulation data which does not exist in (or match with) a coding rule will be shown in FIG. 13 and the construction thereof will be described. The basic construction of the present embodiment is a construction in which a mis-code detecting circuit 35 is added to the data demodulating circuit shown in FIG. 1. The mis-code detecting circuit 35 performs the comparison with a code table on the basis of demodulation data of a PRML processing circuit 22 or performs a so-called decoding process and turns a mis-code detection signal on in the case where a data series existing in no code table is detected. EPRML activation signal EPRON turn-on conditions of a data reliability information detecting circuit 24 include the mis-code detection signal in addition to reliability information of the likelihood differences of two states of the PRML processing circuit 22 and the detection of a path memory overflow.

In the case where mis-code is detected by the mis-code detecting circuit 35, an EPRML processing circuit 26 performs the demodulation of data on the basis of an EPRML receive signal in a period of time indicated by the EPRML activation signal. Further, a multiplexer 28 performs a processing for replacement of demodulation data of the PRML processing circuit 22 by demodulation data of the EPRML processing circuit 26 corresponding thereto. As shown in the foregoing, the above-mentioned data demodulating circuit can also be constructed by using the coding rule as the data reliability.

Figure 14:
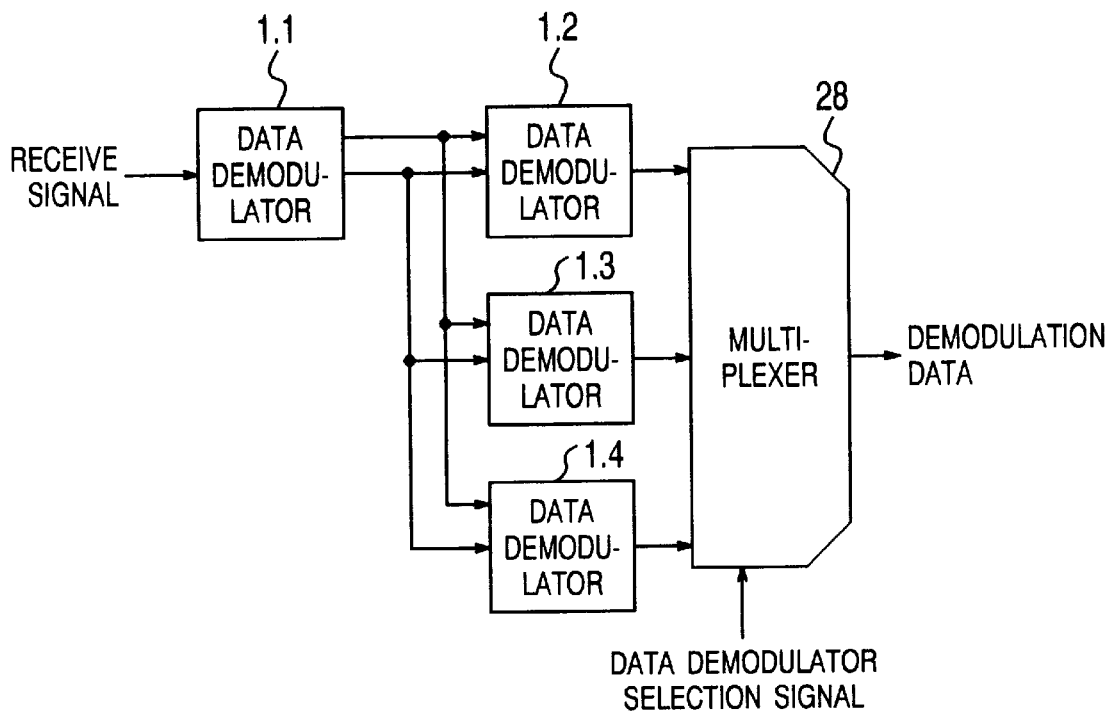
FIG. 14 shows an example of another construction which embodies the present invention.

FIG. 14 shows another embodiment of the data demodulating circuit of the present invention. Demodulation data generated from a data demodulator 1.1 and reliability information for the demodulation data are supplied to a plurality of data demodulators 1.2, 1.3 and 1.4 in the next stage to control the operations of these demodulators by data reliability information having different thresholds for data reliability. The outputs of the data demodulators 1.2, 1.3 and 1.4 are selected by a multiplexer 28 at any time. With such a construction, it becomes possible to use a high-efficiency data demodulator with large circuit scale and power consumption more properly in accordance with its capability. The number of data demodulators in the next stage can be set arbitrarily. Also, the reliability information is generated on the basis of a likelihood difference. The data discriminating capabilities of the data demodulators may be different, the same or partially different.

Figure 15:
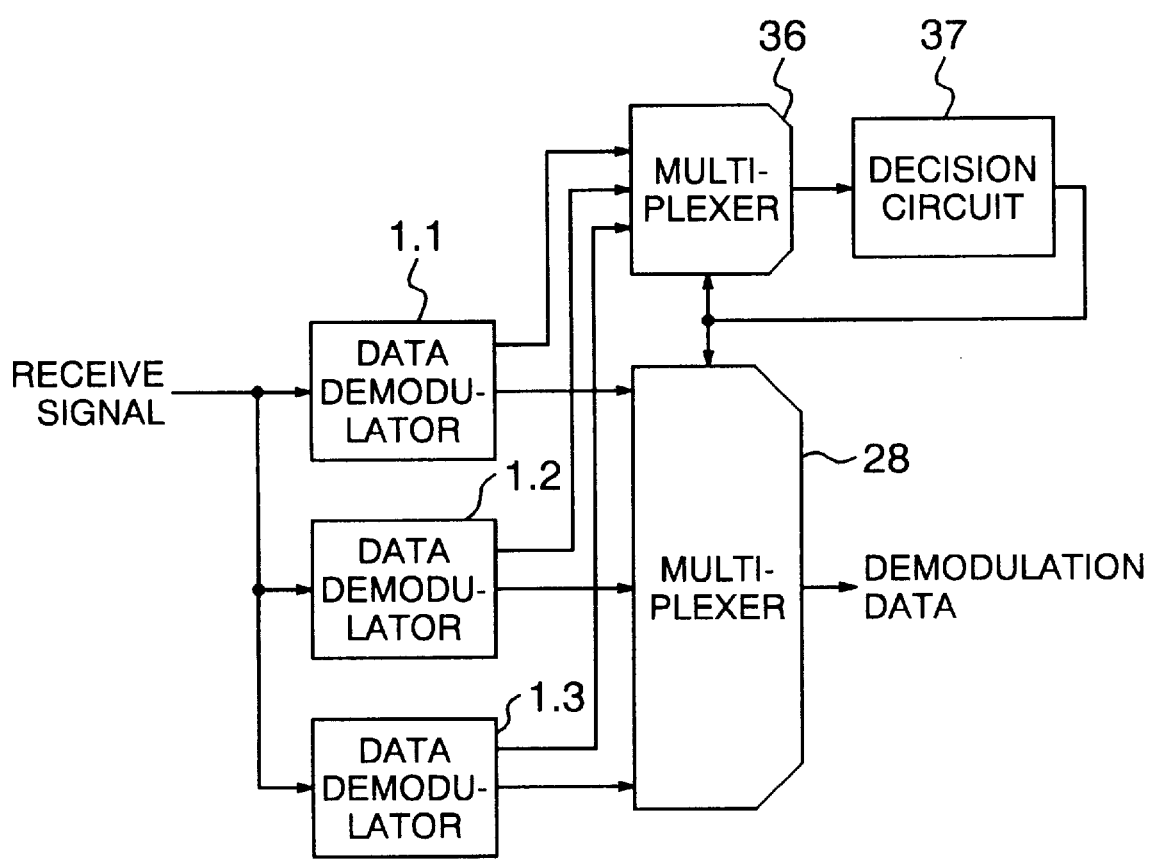
FIG. 15 shows an example of a further construction which embodies the present invention.

FIG. 15 shows a further embodiment of the data demodulating circuit of the present invention. Data demodulators 1.1, 1.2 and 1.3 have different data discriminating capabilities and each data demodulator outputs demodulation data and reliability information for the demodulation data. Each of multiplexers 36 and 28 receives a data demodulator selection signal provided by a decision circuit 37 to select and output one corresponding information. The multiplexer 36 selects the corresponding reliability information and outputs it to the decision circuit 37. The multiplexer 28 selects demodulation data of the corresponding data demodulator and outputs it as demodulation data of the demodulating circuit. The decision circuit 37 decides a receive signal demodulating performance on the basis of reliability information of a data demodulator which is being used at the present time. For example, in the case where the data demodulator 1.1 is being used, the reliability information of the data demodulator 1.1 is transmitted to the decision circuit 37 through the multiplexer 36. In the case where it is decided that the reliability information is remarkably deteriorated, the decision circuit 37 performs data demodulation using a data demodulator having a higher data demodulating or discriminating capability. For example, the data demodulator 1.2 is selected to perform a data demodulation processing. The decision circuit 37 may be a dedicated hardware or a software controlled by a microcomputer. In the case where the control is made by the software, an example of the construction of reliability information as the output of the multiplexer 36 and selection information for the multiplexers 36 and 28 may be given in a register whose information can be controlled by the software. According to the present embodiment, an effect similar to those in the foregoing embodiments can be obtained and it becomes possible to use a data demodulator with high data discriminating capability but with large power consumption because of its complicated circuit construction more properly in accordance with its capability. The number of data demodulators can be set arbitrarily. The reliability information is generated on the basis of a likelihood difference.

Figure 16:
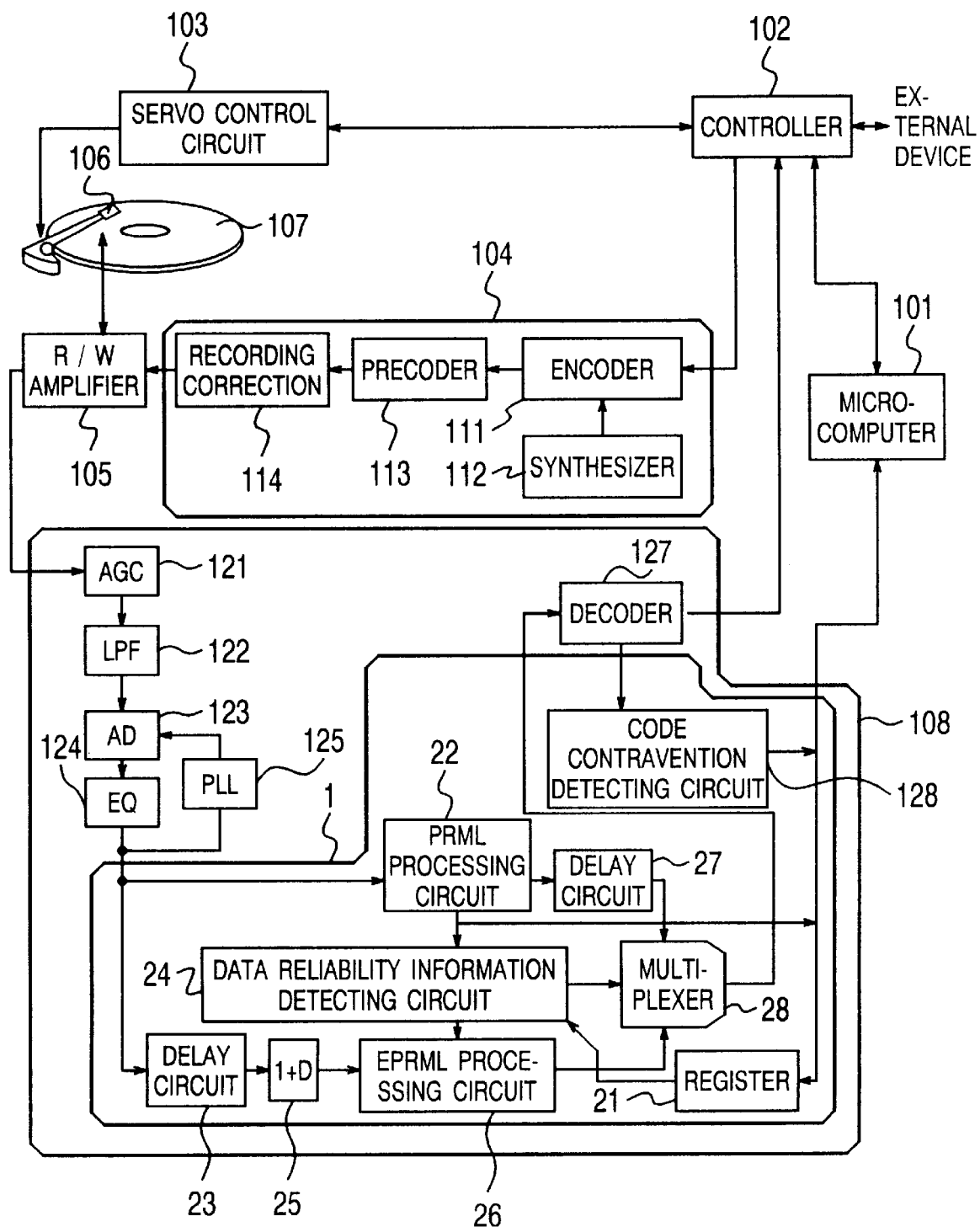
FIG. 16 shows an embodiment of a magnetic recording/reproducing apparatus using the present invention.
Figure 17:
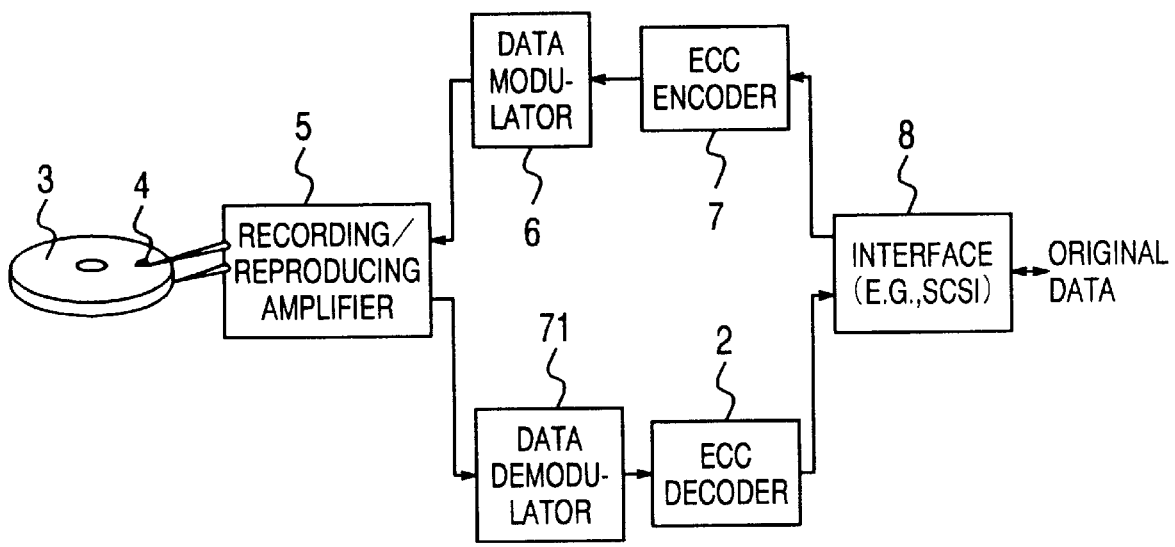
Figure 18:
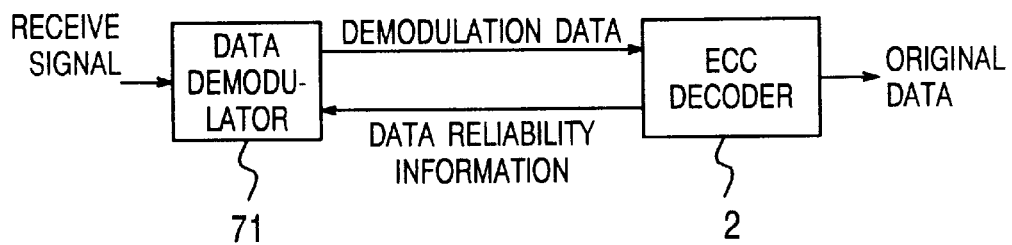
FIG. 18 is a diagram showing the concept of a data demodulating method using a connection code.

FIG. 16 shows an embodiment of a magnetic recording/reproducing apparatus using the data demodulating circuit of the present invention. The communication of data between an external device such as a personal computer and the magnetic recording/reproducing apparatus is performed through a controller 102 in the magnetic recording/reproducing apparatus. First, explanation will be made of the case where data from the external device is to be recorded. When a data recording instruction is received, an instruction for movement of a recording/reproducing head 106 to a position (or track) to be subjected to recording is issued from the controller 102 to a servo control circuit 103. After the completion of movement of the recording/reproducing head, recording data is recorded onto a recording medium 107 through a recording data processing circuit 104, an R/W amplifier 105 and the recording/reproducing head 106.

The recording data processing circuit 104 is composed of an encoder 111, a synthesizer 112, a precoder 113 and a recording correction circuit 114. The encoder 111 subjects recording data to a coding process following a coding rule, for example, 8/9GCR (0, 4/4) code conversion. The encoded data series is delivered in accordance with a recording bit period of the synthesizer 112. The precoder 113 makes the code conversion of the data series again in order to give a fixed restraint condition to the data series. The recording correction circuit 114 removes the non-linearity of a recording process peculiar to magnetic recording. The recording process is performed through the above operation.

Next, a data reproducing operation will be described. When a data reproducing instruction is received, an instruction for movement of the recording/reproducing head 106 to a data-recorded position (or track) is issued from the controller 102 to the servo control circuit 103. After the completion of movement of the recording/reproducing head, a signal recorded on the recording medium 107 is inputted to a data demodulating circuit 108 through the recording/reproducing head 106 and the R/W amplifier 105. Demodulation data demodulated by the data demodulating circuit 108 is outputted to the controller 102 which in turn transfers the data to the external device after checking the validity of data.

The data demodulating circuit 108 is composed of an AGC circuit 121 for making the amplitude of a reproduced waveform from the head constant, a band elimination filter (LPF) 122 for eliminating noises outside of a signal band, an AD converter 123 for sampling the reproduced signal, an equalizer (EQ) 124 for eliminating interference between codes from the reproduced waveform, a phase synchronizing (or PLL) circuit 125 for determining the timing of sampling by the AD converter 123, a data demodulating circuit 1 according to the present invention, and a decoder 127 for performing a process for decoding of demodulation data.

A microcomputer 101 performs a processing for the whole of the apparatus inclusive of the controller 102 and the data demodulating circuit 108 by software. In the shown example, the microcomputer 101 performs the detection of the result of detection by a code contravention detecting circuit 128 (which will be mentioned later on), the detection of a likelihood difference of a PRML processing circuit 22, the setting of a register 21 for giving a decision threshold of a data reliability information detecting circuit 24, and so forth.

Basically, the data demodulating circuit 1 can be constructed by the data demodulating circuit in all the data demodulating circuits of the foregoing embodiments and the operation is the same as that mentioned in the foregoing. The code contravention detecting circuit 128 in the present embodiment detects the input of demodulation data having no matching with the coding rule when the process for decoding of demodulation data is performed by the decoder 127. An output of the code contravention detecting circuit 128 is delivered to a register 21 or as in interruption signal to the microcomputer 101.

In the present embodiment, there is shown a construction in which the likelihood differences of two states of a PRML processing circuit 22 are detectable by the microcomputer 101. The microcomputer 101 may use the code contravention detecting circuit or the likelihood differences of two states of the PRML processing circuit 22 to perform a processing which include, for example, the change of a setting value of the register 21 for changing a decision threshold of a data reliability information detecting circuit 24 or the switching in process to a data demodulating circuit (not shown) having a higher data demodulating capability. Further, it is also possible to change the data demodulating capability by utilizing those reliability information to change the filter coefficients of the LPF 122 and the equalizer 124 or the various characteristics of the AGC 121 and the PLL 125. According to the embodiment mentioned above, a magnetic recording/reproducing apparatus having a high data demodulating capability in spite of a low power consumption is constructed. Also, the power consumption of a recording/reproducing control LSI formed by the LSI configuration of the recording data processing circuit 104 and the data demodulating circuit 108 can be made low by using the present invention.

In the present invention, the PRML and EPRML processing circuits 22 and 23 are disclosed as the first and second data demodulators, respectively. However, the kinds of the first and second data demodulators are not limited to the disclosed examples.

So far as a relationship between the data discriminating capability of the first data demodulator and the data discriminating capability of the second data demodulator have a relationship is such that the latter is higher than the former, any combination of two of a PRML data demodulator, an EPRML data demodulator, an EEPRM data demodulator and TRELLIS data demodulator is possible. If the above relationship is satisfied, other data demodulators may be used.

The present invention is not limited to the disclosed embodiments and includes any modifications which are included by the spirit of claims.

What is claimed is:

1. An information recording/reproducing method in an information recording/reproducing apparatus including a plurality of data demodulators which perform data demodulation of an input signal, said method comprising:

generating first demodulation data and reliability information of said first demodulation data by a data demodulator in a first stage of said plurality of data demodulators;

supplying said first demodulation data and said reliability information of said first demodulation data to the data demodulators in a next stage;

controlling the operations of the data demodulators in said next stage on the basis of control information having different thresholds for said reliability information of said first demodulation data; and selecting second demodulation data from the data demodulators in said next stage.

2. An information recording/reproducing method according to claim 1, wherein said reliability information is generated on the basis of a likelihood difference at the time of data demodulation.

3. An information recording/reproducing apparatus, comprising:

a first data demodulator for receiving an input signal to generate demodulation data and reliability information of the demodulation data;

a plurality of second data demodulators connected to a rear stage of said first data demodulator for receiving said demodulation data and said reliability information of the demodulation data; and a circuit for synthesizing demodulation data of said plurality of second data demodulators.

4. An information recording/reproducing apparatus according to claim 3, wherein said plurality of second data demodulators include circuits for deciding said reliability information by different thresholds, respectively.

* * * * *